United States Patent [19]
Fujiki et al.

[11] Patent Number: 5,516,838
[45] Date of Patent: May 14, 1996

[54] FLAME RETARDANT SILICONE COMPOSITIONS

[75] Inventors: Hironao Fujiki, Takasaki; Masayuki Ikeno, Maebashi; Hiroyasu Hara, Annaka; Kazuyasu Satoh, Gumma, all of Japan

[73] Assignee: Shin-Etsu Chemical Co., Ltd., Tokyo, Japan

[21] Appl. No.: 516,515

[22] Filed: Aug. 17, 1995

Related U.S. Application Data

[63] Continuation of Ser. No. 233,959, Apr. 28, 1994, abandoned.

[30] Foreign Application Priority Data

Apr. 30, 1993 [JP] Japan ................................ 5-128393

[51] Int. Cl.$^6$ .................................................. C08K 5/49
[52] U.S. Cl. .................... 524/711; 524/714; 524/720; 524/722; 524/731; 524/862
[58] Field of Search ........................... 524/862, 714, 524/731, 711, 722, 720

[56] References Cited

U.S. PATENT DOCUMENTS

| | | | |
|---|---|---|---|
| 3,723,497 | 5/1973 | Baney | 260/46.5 UA |
| 4,013,611 | 5/1977 | Hechtl et al. | 260/37 SB |
| 4,051,454 | 9/1977 | Leiser et al. | 338/328 |
| 4,130,707 | 12/1978 | Leiser et al. | 528/15 |
| 4,444,944 | 4/1984 | Matsushita | 524/786 |
| 4,477,626 | 10/1984 | Suzuki | 524/862 |
| 4,544,696 | 10/1985 | Streusand et al. | 524/428 |
| 4,722,957 | 2/1988 | Braun et al. | 524/262 |
| 4,868,251 | 9/1989 | Reich et al. | 525/479 |
| 5,260,364 | 11/1993 | Johnson | 524/413 |

FOREIGN PATENT DOCUMENTS

| | | |
|---|---|---|
| 0153700 | 4/1985 | European Pat. Off. |
| 0517524 | 9/1992 | European Pat. Off. |
| 0547571 | 6/1993 | European Pat. Off. |
| 2396788 | 2/1979 | France. |
| 594154 | 11/1947 | United Kingdom. |

*Primary Examiner*—John C. Bleutge
*Assistant Examiner*—Karen A. Dean
*Attorney, Agent, or Firm*—Birch, Stewart, Kolasch & Birch

[57] ABSTRACT

To a silicone composition comprising (A) an organopolysiloxane having at least two alkenyl groups in a molecule, (B) an organohydrogenpolysiloxane having at least two hydrogen atoms each directly attached to a silicon atom in a molecule, and (C) a platinum catalyst, (D) a compound having a phenyl group and a secondary or tertiary amino group directly attached thereto is added to render the composition flame retardant. The composition cures into a transparent product having improved flame retardancy meeting the UL standard and is suitable for use in the protection of electronic parts like ICs and hybrid ICs.

11 Claims, No Drawings

FLAME RETARDANT SILICONE COMPOSITIONS

This application is a continuation, of application Ser. No. 08/233,959 filed on Apr. 28, 1994, now abandoned.

BACKGROUND OF THE INVENTION

1. Field of the Invention

This invention relates to a flame retardant silicone composition which cures into a transparent product and is suitable for the protection of ICs and hybrid ICs.

2. Prior Art

For addition curing type silicone rubber compositions which cure into elastomers, a number of techniques are known for rendering them flame retardant. The most basic technique is to add platinum compounds to organopolysiloxanes. The addition of benzotriazoles, hydrazines and similar compounds is known effective for improving flame retardancy. Fumed titanium oxide, cerium oxide, cerium hydroxide, iron oxide and carbon powder are also known effective.

All the prior art silicone rubber compositions of this type contain reinforcing inorganic fillers such as fumed silica and quartz powder. Flame retardant silicone compositions essentially free from reinforcing inorganic fillers are unknown.

One known transparent material based on organopolysiloxane is silicone gel which finds use as a filler for parts used in optical equipment, a protective material for hybrid ICs used in electric and electronic parts to be mounted on automobiles, and a protective sealing agent for commercial power modules.

Although flame retardancy is essentially required in these fields, prior art silicone compositions could not meet the requirement. It was a common approach in the art to ensure that parts as a whole are flame retardant. As greater attention is now paid to the environmental problem, the requirement for flame retardancy becomes severe. There is a need for a silicone composition which offers not only transparency, but also flame retardancy.

SUMMARY OF THE INVENTION

Regarding a silicone composition comprising (A) an organopolysiloxane having at least two alkenyl groups in a molecule, (B) an organohydrogenpolysiloxane having at least two hydrogen atoms each directly attached to a silicon atom in a molecule, (C) a platinum catalyst, and curing to a transparent product, the inventors have found that when (D) a compound having a phenyl group and a secondary or tertiary amino group directly attached thereto is added to the composition, the composition is rendered fully flame retardant insofar as it is devoid of reinforcing inorganic fillers such as fumed silica and quartz powder which are otherwise blended in all conventional flame retardant silicone compositions. Particularly when the content of non-functional low-molecular weight siloxanes having a degree of polymerization of 3 to 10 ($D_3$ to $D_{10}$) in components (A) and (B) is controlled low, the composition is further improved in flame retardancy as demonstrated by a flame retardant level rated as UL-94 V-0.

Accordingly, the present invention provides a flame retardant silicone composition which cures to a transparent product, comprising (A) 100 parts by weight of an organopolysiloxane having at least two alkenyl groups in a molecule, (B) about 0.1 to about 30 parts by weight of an organohydrogenpolysiloxane having at least two hydrogen atoms each directly attached to a silicon atom in a molecule, (C) about 0.1 to about 1,000 parts by weight per million parts by weight of the composition of a platinum catalyst, and (D) about 0.01 to about 1 part by weight of a compound having a phenyl group and a secondary or tertiary amino group directly attached thereto. Preferably components (A) and (B) contain non-functional low-molecular weight siloxanes $D_3$ to $D_{10}$ in a total amount of less than about 1,000 parts by weight per million parts by weight of components (A) and (B).

DETAILED DESCRIPTION OF THE INVENTION

Component (A) is an organopolysiloxane having at least two alkenyl groups in a molecule. Preferably component (A) is an organopolysiloxane of the following formula.

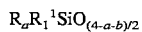

$$R_a R_1^1 SiO_{(4-a-b)/2}$$

In the formula, R is a lower alkenyl group such as vinyl, allyl and butenyl groups, with the vinyl group being preferred. $R^1$ is a methyl or phenyl group. No satisfactory flame retardancy is achieved when $R^1$ is a group other than the methyl or phenyl, for example, a trifluoropropyl group. Letters a and b are positive numbers which are selected such that component (A) contains at least two Rs (alkenyl groups). More preferably, $1.9 < a < 2.4$ and $0.001 < b < 0.05$. The sum of a+b is in the range of 1.9 to 2.4. The organopolysiloxane may be either a linear one or a branched one containing a $RSiO_{3/2}$ or $SiO_{4/2}$ unit.

Preferably the organopolysiloxane has a viscosity of about 100 to about 100,000 centistokes at 25° C., especially about 100 to about 10,000 centistokes at 25° C. With a viscosity of less than 100 centistokes, the resulting cured product would be brittle. With a viscosity of more than 100,000 centistokes, the composition would be less flowing, difficult to cast and less flame retardant.

It is acceptable in the invention that in addition to component (A), an organopolysiloxane containing only one alkenyl group in a molecule or an organopolysiloxane free from an alkenyl group is added for hardness adjustment.

Component (B) is an organohydrogenpolysiloxane having at least two hydrogen atoms each directly attached to a silicon atom in a molecule, which serves as a crosslinking agent by reacting with component (A). No particular limit is imposed on the molecular structure and any of conventional well-known organohydrogenpolysiloxanes including linear, cyclic and branched structures may be used. Preferably the organohydrogenpolysiloxane has a methyl and/or phenyl group as a substituent attached to a silicon atom other than hydrogen.

Component (B) is preferably added in amounts of about 0.5 to about 5.0 equivalents, especially about 0.8 to about 2.0 equivalents per alkenyl group in the entire composition. Less than 0.5 equivalents of component (B) on this basis would provide a lower crosslinking density and adversely affect the heat resistance of cured product. More than 5.0 equivalents of component (B) would give rise to a bubbling problem by inducing dehydrogenation reaction and also adversely affect the heat resistance of cured product. Quantitatively stated, about 0.1 to about 30 parts by weight of component (B) is added per 100 parts by weight of component (A). It is preferred that the sum of hydrogen atoms each directly attached to a silicon atom in component (B) and alkenyl groups in component (A) is at least 5 because if the sum of hydrogen atoms and alkenyl groups is less than 5, sufficient crosslinking to form a three-dimensional structure would not take place, resulting in an unsatisfactory cured product.

We have found that the content of nonfunctional, low-molecular weight siloxanes in components (A) and (B) is a significant factor dictating flame retardancy. In general, component (A) an organopolysiloxane is prepared by effecting equilibration of cyclopolysiloxanes in the presence of a strongly basic catalyst (e.g., potassium hydroxide, tetraalkylammonium hydroxides, and tetraalkylphosphonium hydroxides) or a siliconate compound thereof, followed by neutralization and deactivation of the catalyst. From the resulting polymer, concomitant low-molecular weight siloxane by-products are generally removed by stripping at elevated temperature in vacuum. While the level of removal depends on economy, currently available polymers of commercial grade contain low-molecular weight compounds having 3 to 10 silicon atoms in a molecule in a total amount of several thousand to several ten thousand ppm. We have found that significant flame retardancy improvement is achieved by controlling the content of low-molecular weight compounds to about 1,000 ppm or lower, especially about 500 ppm or lower. The term ppm is parts by weight per million parts by weight of the entire polymer.

We thus recommend that the total content of non-functional low-molecular weight siloxanes having a degree of polymerization of 3 to 10 ($D_3$ to $D_{10}$) in components (A) and (B) is controlled to less than about 1,000 ppm, especially less than about 500 ppm.

For removing the majority of low-molecular weight siloxanes to provide such a limited content, enhanced separation techniques including critical extraction, low-molecular weight component extraction with the aid of solvent, and stripping by thin-film evaporation are recommended rather than conventional commonly employed evaporation techniques. After low-molecular weight compounds have been removed by vacuum heat treatment such as thin-film evaporation, the amount of silanol remaining in component (A) is naturally reduced. The low-molecular weight compound content can be measured by FID gas chromatography.

Component (C) is a platinum catalyst for promoting addition reaction or hydrosilation between components (A) and (B). The catalyst is well known in the art and selected from platinum and platinum compounds, for example, platinum black, chloroplatinic acid, alcohol modified chloroplatinic acid, and complexes of chloroplatinic acid with olefin aldehydes, vinylsiloxanes and acetylene alcohols. The catalyst is used in a catalytic amount which may be suitably selected in accordance with a desired curing rate. In general, the platinum catalyst is added in an amount of about 0.1 to about 1,000 ppm, preferably about 10 to about 200 ppm of platinum, based on the weight of the entire composition.

The silicone composition of the invention further contains (D) a compound having a phenyl group and a secondary or tertiary amino group directly attached to the phenyl group.

Although the interaction of this compound is not well understood, it was found by an actual burning test to be quite effective for rendering the composition flame retardant. While such nitrogenous compounds as hydrazines, azobisisobutyronitrile, benzotriazoles, and aminosiloxane oil are known as components effective for imparting flame retardancy to conventional thermosetting silicone rubber compositions using peroxides, all of these nitrogenous compounds are not effective in the present invention. The nitrogenous compounds which are effective in the inventive composition are limited to those compounds having a secondary or tertiary amino group adjacent to a phenyl skeleton. Examples of the nitrogenous compound which is found effective in the inventive composition include benzotriazole, benzimidazole, phenoxazine, N-allylaniline, p-anilinophenol, m-anilinophenol, 2-phenylindole, 2-anilinoethanol and siloxane-modified products thereof.

Component (D) is used in an amount of about 0.01 to about 1 part by weight, preferably about 0.05 to about 0.5 parts by weight per 100 parts by weight of component (A).

In the inventive composition, reinforcing fillers which are essential in conventional silicone compositions, for example, such as fumed silica and finely divided silica by the wet system are omitted because they adversely affect flame retardancy.

Insofar as transparency and other desirable properties are maintained, such additives as carbon black, red iron oxide, cerium oxide, cerium hydroxide, titanium oxide, and titanates may be added. Addition of alumina and analogues does not necessarily raise a problem insofar as the objects of the invention are not impaired, but heavy loading of alumina would offset the advantage associated with the removal of low-molecular weight siloxanes. It is then desired that these additives be added in limited amounts of 0 to about 5 parts, especially 0 to about 0.5 parts by weight per 100 parts by weight of component (A).

The inventive composition can be cured at room temperature or at an appropriate temperature corresponding to its application, yielding a transparent, flame retardant silicone rubber or gel.

Therefore, the present invention makes it possible to impart flame retardancy to transparent silicone rubber which has been regarded difficult to render flame retardant in the prior art. Since flame retardancy can be imparted to silicone gel which has been widely used for the protection of integrated circuits, these electronic parts are further improved in reliability.

EXAMPLE

Examples of the present invention are given below by way of illustration and not by way of limitation.

Examples 1–19 & Comparative Examples 1–3

The following components were furnished and silicone compositions of the formulation shown in Tables 1 to 3 were prepared therefrom. The compositions were cured by heating at 150° C. for 60 minutes and the cured products were evaluated for hardness, penetration, and flame retardancy by the methods described below. The results are shown in Tables 1 to 3.

Components (Note: the $D_3$–$D_{10}$ content is a content of low-molecular weight siloxanes $D_3$ to $D_{10}$.)

Component (A)

A-1

Dimethylpolysiloxane end-blocked with a dimethylvinylsilyl group having a viscosity of 100 centistokes at 25° C. and a $D_3$–$D_{10}$ content of 840 ppm.

A-2

Dimethylpolysiloxane end-blocked with a dimethylvinylsilyl group having a viscosity of 1,000 centistokes at 25° C. and a $D_3$–$D_{10}$ content of 50 ppm.

A-3

Dimethylpolysiloxane end-blocked with a dimethylvinylsilyl group having a viscosity of 1,000 centistokes at 25° C. and a $D_3$–$D_{10}$ content of 580 ppm.

A-4

Dimethylpolysiloxane end-blocked with a dimethylvinylsilyl group having a viscosity of 1,000 centistokes at 25° C. and a $D_3$–$D_{10}$ content of 750 ppm.

A-5

Dimethylpolysiloxane end-blocked with a dimethylvinylsilyl group having a viscosity of 1,000 centistokes at 25° C. and a $D_3$–$D_{10}$ content of 7,280 ppm.

A-6

Dimethylpolysiloxane end-blocked with a dimethylvinylsilyl group having a viscosity of 10,000 centistokes at 25° C. and a $D_3$–$D_{10}$ content of 790 ppm.

A-7

Organopolysiloxane end-blocked with a dimethylvinylsilyl group, containing 5 mol % of a diphenylsiloxy group and the remainder of a dimethylisiloxy group, having a viscosity of 3,000 centistokes at 25° C. and a $D_3$–$D_{10}$ content of 830 ppm.

A-8

Dimethylpolysiloxane blocked with a dimethylvinylsilyl group at one end on average having a viscosity of 800 centistokes at 25° C. and a $D_3$–$D_{10}$ content of 620 ppm.

Component (B)

Methylhydrogenpolysiloxane of the following average structural formula having viscosity of 120 centistokes at 25° C. and a content of 2,560 ppm.

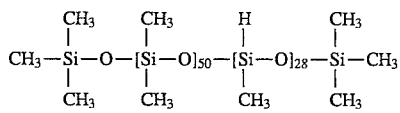

Component (C)

A dimethylpolysiloxane solution of a chloroplatinic acid-vinylsiloxane complex containing 1% by weight of platinum.

Component (D)

D-1: benzotriazole
D-2: benzimidazole
D-3: siloxane- modified p-anilinophenol

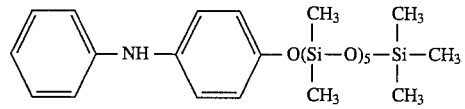

D-4: aniline

R-812: trimethylsilylated hydrophobic fumed silica commercially available from Degussa A.G. CB: acetylene black HS-100 commercially available from Denki Kagaku K.K.

Hardness

JIS A scale hardness

Penetration penetration of a ¼ cone according to JIS K-2220

Flame retardancy

In the flame retardant test, bars of 125 mm×13 mm cut from a cured sheet of 3 mm thick were subjected to the vertical burning test procedure set forth in Underwriters' Laboratories, Inc. Bulletin 94, Burning Test for Classifying Materials (UL-94). The time of lfaming and/or glowing after removal of the igniting flame was measured. The time reported in Tables 1 to 3 is an average of five bars.

TABLE 1

| | Example | | | | | | | |
|---|---|---|---|---|---|---|---|---|
| | 1 | 2 | 3 | 4 | 5 | 6 | 7 | 8 |
| Component (pbw) | | | | | | | | |
| A - 1 | 100 | | | | | | | |
| A - 2 | | 100 | | | | | | |
| A - 3 | | | 100 | | | | | |
| A - 4 | | | | 100 | | | | |
| A - 5 | | | | | 100 | | | |
| A - 6 | | | | | | 100 | | |
| A - 7 | | | | | | | 100 | |
| A - 8 | | | | | | | | 100 |
| B | 4.5 | 2.0 | 2.0 | 2.0 | 2.0 | 1.25 | 1.5 | 2.0 |
| C | 0.25 | 0.25 | 0.25 | 0.25 | 0.25 | 0.25 | 0.25 | 0.25 |
| D - 1 | 0.01 | 0.01 | 0.01 | 0.01 | 0.01 | 0.01 | 0.01 | 0.01 |
| Properties | | | | | | | | |
| Hardness Flaming time (sec.) | 7 | 6 | 6 | 6 | 6 | 1 | 10 | 55* |
| 1st ignition | 18 | 5 | 5 | 9 | 23 | 9 | 6 | 6 |
| 2nd ignition | 26 | 7 | 12 | 10 | 49 | 32 | 33 | 14 |

*penetration

TABLE 2

| | Example 9 | Comparative Example 1 | Example 10 | Example 11 | Example 12 | Comparative Example 2 | Comparative Example 3 | Example 13 |
|---|---|---|---|---|---|---|---|---|
| Component (pbw) | | | | | | | | |
| A - 3 | 100 | 100 | 100 | 100 | 100 | 100 | 100 | 100 |
| B | 2.0 | 2.0 | 2.0 | 2.0 | 2.0 | 2.0 | 2.0 | 2.0 |
| C | 0.05 | 0.25 | 0.50 | 0.25 | 0.25 | 0.25 | 0.25 | 0.25 |
| D - 1 | 0.01 | — | 0.01 | | | | 0.01 | 0.01 |
| D - 2 | | | | 0.01 | | | | |
| D - 3 | | | | | 0.1 | | | |
| D - 4 | | | | | | 0.01 | | |
| R - 812 | | | | | | | 1 | |
| C · B | | | | | | | | 1 |
| Properties | | | | | | | | |
| Hardness | 3 | 7 | 9 | 5 | 0 | 0 | 11 | 7 |
| Flaming time (sec.) | | | | | | | | |
| 1st ignition | 12 | 28 | 4 | 6 | 16 | 180 | 128 | 2 |
| 2nd ignition | 53 | 93 | 9 | 15 | 12 | 54 | 75 | 6 |

TABLE 3

| | Example 14 | Example 15 | Example 16 | Example 17 | Example 18 | Example 19 |
|---|---|---|---|---|---|---|
| Component (pbw) | | | | | | |
| A - 2 | 100 | 100 | 100 | 100 | 100 | 100 |
| B | 1.4 | 0.8 | 0.8 | 0.8 | 0.8 | 0.8 |
| C | 0.25 | 0.25 | 0.25 | 0.25 | 0.25 | 0.25 |
| D - 1 | 0.01 | 0.01 | 0.01 | 0.01 | 0.01 | 0.01 |
| D - 3 | | | 0.1 | 0.2 | 0.5 | 1.0 |
| penetration | 15 | 56 | 56 | 69 | 69 | 69 |
| Properties | | | | | | |
| Flaming time (sec.) | | | | | | |
| 1st ignition | 25 | 32 | 9 | 7 | 10 | 10 |
| 2nd ignition | 12 | 39 | 9 | 8 | 16 | 11 |

All the cured products were substantially transparent.

There has been described a silicone composition which cures into a transparent product having improved flame retardancy. The composition finds use in IC and hybrid IC protection.

Japanese Patent Application No. 5-128393 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A flame retardant silicone composition comprising (A) 100 parts by weight of an organopolysiloxane having at least two alkenyl groups in a molecule, (B) about 0.1 to about 30 parts by weight of an organohydrogenpolysiloxane having at least two hydrogen atoms each directly attached to a silicon atom in a molecule, (C) about 0.1 to about 1,000 parts by weight per million parts by weight of the composition of a platinum catalyst, and (D) about 0.01 to about 1 part by weight of a compound having a phenyl group and a secondary or tertiary amino group directly attached to the phenyl group, said components (A) and (B) containing non-functional low-molecular weight siloxanes $D_3$ to $D_{10}$ in a total amount of less than about 1,000 parts by weight per million parts by weight of components (A) and (B), wherein the composition is free of reinforcing inorganic fillers, and the composition cures to a transparent silicon gel.

2. The flame retardant silicone composition according to claim 1, wherein component (A) has the following formula

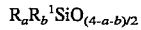

$$R_a R_b^1 SiO_{(4-a-b)/2}$$

wherein R is a lower alkenyl group, $R^1$ is a methyl or phenyl group, $1.9 < a < 2.4$, $0.001 < b < 0.05$ and a+b is in the range of 1.9 to 2.4.

3. The flame retardant silicone composition according to claim 1, wherein component (A) has a viscosity of about 100 to about 100,000 centistokes at 25° C.

4. The flame retardant silicone composition according to claim 1, further comprising an organopolysiloxane having one alkenyl group in a molecule, or an organopolysiloxane free of an alkenyl group.

5. The flame retardant silicone composition according to claim 1, wherein the sum of hydrogen atoms directly attached to a silicon atom in component (B) and alkenyl groups in component (A) is at least 5.

6. The flame retardant silicone composition according to claim 1, wherein components (A) and (B) contain non-functional low-molecular weight siloxanes $D_3$ to $D_{10}$ in a total amount of less than about 500 parts by weight per million parts by weight of components (A) and (B).

7. The flame retardant silicone composition according to claim 1, wherein component (C) is selected from the group consisting of platinum black, chloroplatinic acid, alcohol modified chloroplatinic acid, and complexes of chloroplatinic acid with olefin aldehydes, vinyl-siloxanes and acetylene alcohols.

8. The flame retardant silicone composition according to claim 1, wherein the amount of component (C) is about 10 to about 200 parts by weight per million parts by weight of the composition.

9. The flame retardant silicone composition according to claim 1, wherein the amount of component (D) is about 0.05 to about 0.5 parts by weight per 100 parts by weight of component (A).

10. The flame retardant silicone composition according to claim 1, wherein component (D) is selected from the group consisting of benzotriazole, benzimidazole, phenoxazine, N-allylaniline, p-anilinophenol, m-anilinophenol, 2-phenylindole, 2-anilinoethanol, and siloxane-modified products thereof.

11. A flame retardant silicone composition consisting essentially of (A) 100 parts by weight of an organopolysiloxane having at least two alkenyl groups in a molecule, (B) about 0.1 to about 30 parts by weight of an organohydrogenpolysiloxane having at least two hydrogen atoms each directly attached to a silicone atom in a molecule, (C) about 0.1 to about 1.000 parts by weight per million parts by weight of the composition of a platinum catalyst, and (D) about 0.01 to about 1 part by weight of a compound having a phenyl group and a secondary or tertiary amino group directly attached to the phenyl group, said components (A) and (B) containing non-functional low-molecular weight siloxanes $D_3$ to $D_{10}$ in a total amount of 1,000 parts or less per million parts by weight of components (A) and wherein the composition is free of reinforcing inorganic fillers, and the composition cures to a transparent silicone gel.

* * * * *